United States Patent [19]
Dussud

[11] Patent Number: 6,065,020
[45] Date of Patent: May 16, 2000

[54] DYNAMIC ADJUSTMENT OF GARBAGE COLLECTION

[75] Inventor: Patrick Dussud, Bellevue, Wash.

[73] Assignee: Microsoft Corporation, Redmond, Wash.

[21] Appl. No.: 09/085,980

[22] Filed: May 27, 1998

[51] Int. Cl.$^7$ ...................................................... G06F 17/30
[52] U.S. Cl. .......................... 707/206; 707/103; 395/705; 713/16
[58] Field of Search ..................................... 707/206, 103; 395/705; 713/16; 380/49; 364/200

[56] References Cited

U.S. PATENT DOCUMENTS

| | | | |
|---|---|---|---|
| 4,989,134 | 1/1991 | Shaw ......................................... | 364/200 |
| 5,758,347 | 5/1998 | Lo et al. .................................. | 707/103 |
| 5,842,016 | 11/1998 | Toutonghi et al. ....................... | 709/106 |
| 5,857,210 | 1/1999 | Tremblay et al. ........................ | 707/206 |
| 5,873,104 | 2/1999 | Tremblay et al. ........................ | 707/206 |
| 5,873,105 | 2/1999 | Tremblay et al. ........................ | 707/206 |
| 5,903,899 | 5/1999 | Steele, Jr. ................................. | 707/206 |
| 5,920,720 | 7/1999 | Toutonghi et al. ....................... | 395/705 |
| 5,960,087 | 9/1999 | Tribble et al. ............................ | 380/49 |
| 5,991,779 | 11/1999 | Bejar ........................................ | 707/206 |

OTHER PUBLICATIONS

Jones, Richard and Rafael Lins, *Garbage Collection: Algorithms for Automatic Dynamic Memory Management*, John Wiley & Sons, Chichester, U.K., 1996, Ch. 4, pp. 75–96, 97–116, 143–181.

Jones, Richard and Rafael Lins, *Garbage Collection: Algorithms for Automatic Dynamic Memory Management*, John Wile & Sons, Chicester, U.K., 1996, Ch. 5, pp. 97–116.

Jones, Richard and Rafael Lins, *Garbage Collection: Algorithms for Automatic Dynamic Memory Management*, John Wile & Sons, Chicester, U.K., 1996, Ch. 7, pp. 143–181.

*Primary Examiner*—Thomas G. Black
*Assistant Examiner*—Diane D. Mizrahi
*Attorney, Agent, or Firm*—Klarquist Sparkman Campbell Leigh & Whinston

[57] ABSTRACT

Storage space within a heap may be subject to different types of garbage collection. A first type of garbage collection may be employed when there is a large amount of garbage in the heap, and the second type of garbage collection may be employed when there is a small amount of garbage in the heap. The computer system on which the heap is maintained may include intelligence for automatically deciding which of the garbage collection techniques to employ. The computer system may also automatically control when garbage collection is triggered by setting trigger points according to the amount of garbage collected in the most recent garbage collection. The trigger point may be decreased when there is a high amount of garbage collected, and the trigger point may be increased when there is a low amount of garbage collected.

48 Claims, 5 Drawing Sheets

DYNAMIC ADJUSTMENT OF GARBAGE COLLECTION

TECHNICAL FIELD

The present invention relates generally to computer systems and more particularly to garbage collection techniques.

BACKGROUND OF THE INVENTION

Computer systems generally provide a memory manager to assist computer programs in the dynamic allocation and deallocation of memory. When a computer program needs a block of memory, it requests the memory manager to allocate a block. The memory manager maintains a "heap" of memory from which it allocates the blocks. The memory manager tracks which blocks are currently allocated to the computer program and which blocks are currently available to be allocated. A memory manager typically tracks the currently available blocks using a free list that links together the available blocks. The blocks of the heap that are not on the free list are currently allocated to the computer program.

Some memory managers require that computer programs notify the memory manager when an allocated block is no longer needed by the computer program. Upon receiving the notification, the memory manager adds the block to the free list so that the block is then available to be reallocated. Other memory managers, however, do not require such notification. These other memory managers employ a garbage collection technique to identify which allocated blocks are no longer needed (e.g., accessible) by the computer program. The blocks of memory that are allocated but no longer needed are referred to as "garbage." Periodically, such other memory managers invoke garbage collectors to identify the blocks of memory that are garbage and to add the identified blocks to the free list. If the garbage blocks were not collected, then the garbage blocks of memory could not be reused, and the memory manager may quickly run out of memory available to allocate to the computer program.

Two well-known techniques for garbage collection are mark-and-sweep garbage collection and copying garbage collection. Mark-and-sweep garbage collector proceed with a mark phase and then a sweep phase. During the mark phase, mark-and-sweep garbage collectors mark all blocks of memory that are accessible by the computer program. Mark-and-sweep garbage collectors typically identify accessible blocks by identifying root references to blocks of memory, such as references on the stack or in a register. The mark-and-sweep garbage collectors "mark" the blocks pointed to by these root references and any blocks that are pointed to by a marked block. After all accessible blocks are marked, the mark-and-sweep garbage collectors then start the sweep phase. During the sweep phase, mark-and-sweep garbage collectors start at one end of the heap and checks each block. If a block is not marked, then mark-and-sweep garbage collectors add that block to a free list. When the sweep phase is complete, all inaccessible blocks that were allocated (i.e., garbage) are now on the free list and available to be reallocated to the computer program.

The other well-known garbage collection technique is copying garbage collection. Like mark-and-sweep garbage collectors, copying garbage collectors also identify accessible blocks by following root references and references within any accessible block. Copying garbage collectors copy all accessible blocks from an old area to a new area in memory and update references to point to the accessible blocks in the new area. Once all accessible blocks have been copied, then the old area, which previously contained both the accessible blocks and the inaccessible blocks, contains only blocks that are available to be allocated.

The mark-and-sweep and the copying garbage collection techniques have various advantages and disadvantages. For example, mark-and-sweep garbage collection generally occurs much faster than copying garbage collection. The copying of blocks and the updating references can be time consuming, while the adding of a garbage block to a free list is relatively fast. Mark-and-sweep garbage collection, however, results in memory with much more fragmentation than copying garbage collection. In particular, copying garbage collection typically results in a large block of available memory (e.g., the old space), whereas mark-and-sweep garbage collection typically results in small blocks of available memory separated by allocated memory. As a result, developers of memory managers need to balance these advantages and disadvantages when selecting a garbage collection technique.

Developers also need to determine the appropriate time at which to perform garbage collection. If garbage collection is performed too frequently, then a significant percentage of the computer resources is spent searching for garbage when there is actually a small amount of garbage. In contrast, if garbage collection is performed too infrequently, then a user may notice very significant delays during garbage collection, albeit delays that occur infrequently, because a large amount of garbage may have been generated during the delay. Developers, therefore, typically select a time period at which to perform garbage collection that is a compromise of these considerations.

SUMMARY OF THE INVENTION

Embodiments of the present invention provide a method and system for dynamically adjusting garbage collection based on characteristics of the heap. The dynamically adjusting ("DA") garbage collector of the present invention adjusts both the garbage collection technique that is employed and the timing of the garbage collection based on the characteristics of the heap. When there is a large amount of garbage, the DA garbage collector uses a garbage collection technique that is well suited for large amounts of garbage. Such a technique that works well with a large amount of garbage may not work so well when there is a small amount of garbage. Thus, when there is a small amount of garbage, the DA garbage collector uses a garbage collection technique that works well with such a small amount of garbage. In one embodiment, the DA garbage collector uses a copying garbage collection technique when there is a large amount of garbage and uses a mark-and-sweep garbage collection technique when there is a small amount of garbage. By selecting a garbage collection technique that is based on actual characteristics (e.g., amount of garbage) of the heap, the DA garbage collector avoids the disadvantages of prior garbage collectors that use a predefined single technique regardless of the actual characteristics of the heap.

The DA garbage collector (or the memory manager) also determines when to perform (i.e., trigger) garbage collection based on the amount of memory that has been allocated since garbage collection was last performed. That amount of memory is referred to as the "trigger point" for garbage collection. The DA garbage collector also dynamically adjusts the trigger point based on the amount of garbage that is collected. If a large amount of garbage is collected, the DA garbage collector lowers the trigger point so that garbage collection occurs more frequently. In contrast, if a small amount of garbage is collected, the DA garbage collector raises the trigger point so that garbage collection occurs less frequently. As a result, the DA garbage collector balances the overhead incurred when performing garbage collection too frequently with the delay that results when performing garbage collection too infrequently.

DETAILED DESCRIPTION OF THE INVENTION

Figure 1:
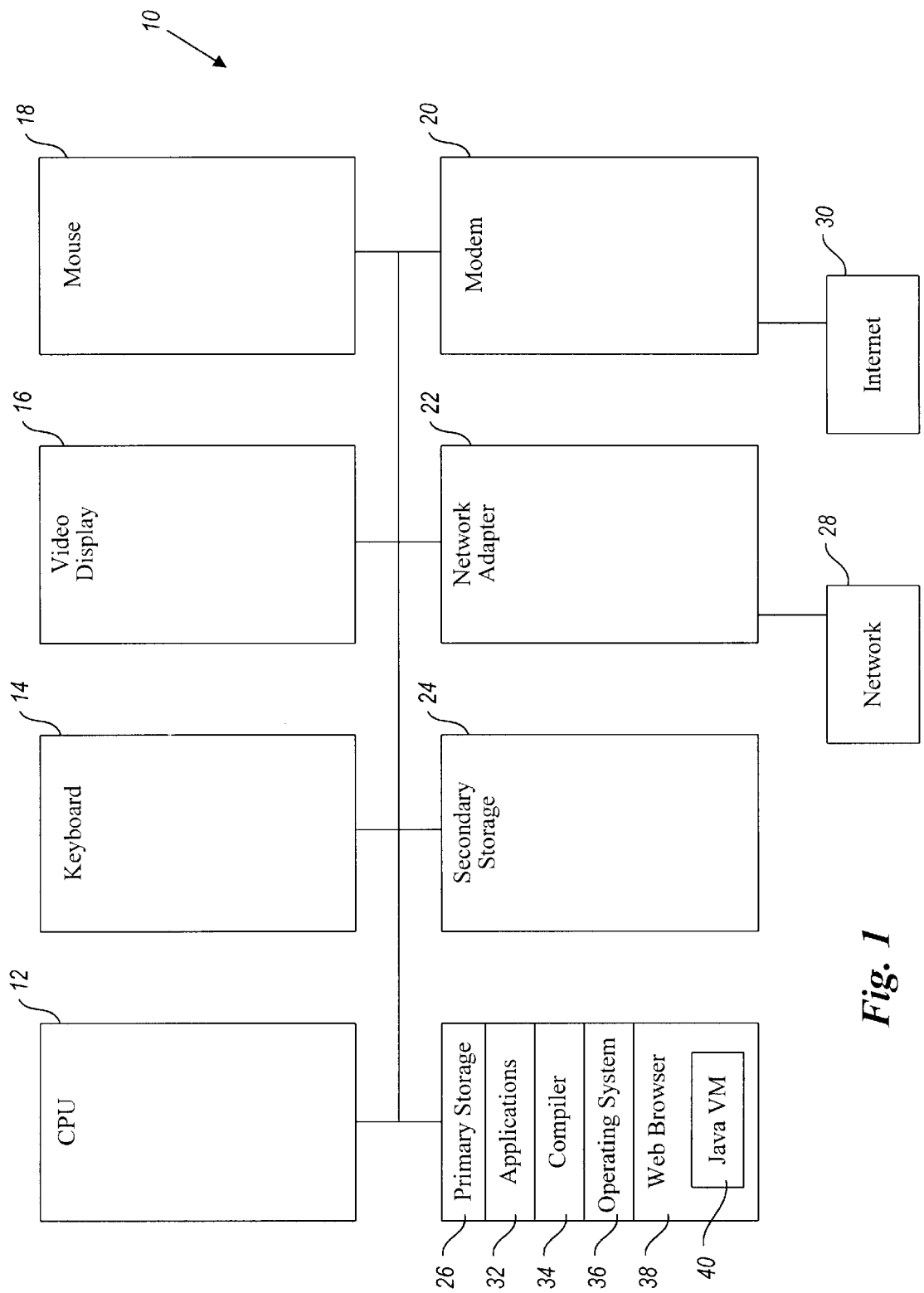
FIG. 1 is a block diagram of a computer system that is suitable for practicing the present invention.

Embodiments of the present invention provide a method and system for dynamically adjusting garbage collection based on characteristics of the heap. The dynamically adjusting ("DA") garbage collector of the present invention adjusts both the garbage collection technique that is employed and the timing of the garbage collection based on the characteristics of the heap. When there is a large amount of garbage, the DA garbage collector uses a garbage collection technique that is well suited for large amounts of garbage. Such a technique that works well with a large amount of garbage may not work so well when there is a small amount of garbage. Thus, when there is a small amount of garbage, the DA garbage collector uses a garbage collection technique that works well with such a small amount of garbage. In one embodiment, the DA garbage collector uses a copying garbage collection technique when there is a large amount of garbage and uses a mark-and-sweep garbage collection technique when there is a small amount of garbage. By selecting a garbage collection technique that is based on actual characteristics (e.g., amount of garbage) of the heap, the DA garbage collector avoids the disadvantages of prior garbage collectors that use a predefined single technique regardless of the actual characteristics of the heap.

The DA garbage collector (or the memory manager) also determines when to perform (i.e., trigger) garbage collection based on the amount of memory that has been allocated since garbage collection was last performed. That amount of memory is referred to as the "trigger point" for garbage collection. The DA garbage collector also dynamically adjusts the trigger point based on the amount of garbage that is collected. If a large amount of garbage is collected, the DA garbage collector lowers the trigger point so that garbage collection occurs more frequently. In contrast, if a small amount of garbage is collected, the DA garbage collector raises the trigger point so that garbage collection occurs less frequently. As a result, the DA garbage collector balances the overhead incurred when performing garbage collection too frequently with the delay that results when performing garbage collection too infrequently.

In one embodiment, the DA garbage collector adjusts the trigger point, which is the amount of memory that will be allocated before the garbage collection is next performed, based on the ratio of the amount of garbage collected to the amount of allocated memory after the garbage is collected. The DA garbage collector determines, each time garbage collection is performed, whether this ratio is between a low threshold and a high threshold. If the ratio is between the thresholds, then the DA garbage collector does not adjust the trigger point. If the ratio is less than the low threshold, a small amount of garbage is being generated, and the DA garbage collector increases the trigger point so that garbage collection occurs less frequently. If the ratio is above the high threshold, a large amount of garbage is being generated, and the DA garbage collector decreases the trigger point so that garbage collection occurs more frequently. The DA garbage collector also places limits on how frequently and how infrequently garbage collection can occur. The DA garbage collector uses a floor trigger point and a ceiling trigger point to limit the trigger point so that garbage collection is not performed when a small amount of memory has been allocated and is performed when a large amount of memory is allocated. The DA garbage collector allows the trigger point to vary only between these limits. In one embodiment, if the ratio is below the low threshold, then the DA garbage collector increases the trigger point by a factor of 2 up to the ceiling trigger point. If the ratio is above the high threshold, then the DA garbage collector decreases the trigger point by a factor of 2 down to the floor trigger point. If the ratio is between the low threshold and the high threshold, the DA garbage collector does not adjust the trigger point.

In one embodiment, the DA garbage collector integrates the use of the free list of mark-and-sweep garbage collection technique with the copying garbage collection technique. As discussed in the background, a mark-and-sweep garbage collector adds collected garbage to a free list, while a copying garbage collector collects garbage in an old space. To ensure that these garbage collectors can be alternately invoked to perform garbage collection on the same heap, the DA garbage collector uses a modified copying garbage collector. In particular, the modified copying garbage collector copies the accessible blocks by allocating blocks from the free list and copying the accessible blocks to the newly allocated blocks. The modified copying garbage collector then adds the entire old space to the free list. The memory manager allocates blocks from the free list irrespective of which garbage collection technique was most recently used. In addition, the copying garbage collector may be generational in that only certain portions of the old space (e.g., a most recent generation) are reclaimed each time garbage collection is performed. Moreover, the DA garbage collector may employ different garbage collection techniques than a mark-and-sweep garbage collector and a copying garbage collector. However, a mark-and-sweep garbage collector is preferable when there is a small amount of garbage.

FIG. 1 depicts a computer system 10 that is suitable for the exemplary operating environment. The computer system 10 includes a central processing unit (CPU) 12 that controls the operations of the computer system. The computer system 10 may also include a number of input/output devices, such as a keyboard 14, a video display 16 and a mouse 18. The computer system 10 may have a modem 20 to enable the computer system to communicate with remote computing resources, such as the Internet 30 over conventional telephone lines. Those skilled in the art will appreciate that the modem 20 may also be used to communicate with intranets, extranets, and other remote computers. A network adapter 22 may be provided in a computer system 10 to enable the computer system to be coupled to a network 28. This network 28 may be a local area network (LAN) or a wide area network (WAN).

The computer system includes primary storage 26 and secondary storage 24. The secondary storage 24 may include computer removable media such as floppy disks, other types of magnetic disks and optical disks, such as CD-ROMS or DVD disks. The primary storage 26 may hold a number of programs including an application program 32, such as word processing programs, spreadsheet programs, and other types of applications. The primary storage 26 may also hold a copy of a compiler 34 and an operating system 36. A suitable operating system is the MICROSOFT WINDOWS 95 operating system from Microsoft Corporation of Redmond, Wash. The primary storage 26 may hold a web browser 38 for viewing web pages on the Internet 30. A suitable web browser 38 is the Microsoft Internet Explorer 4.0 web browser. The web browser 38 includes support for programs written in the Java programming language. As such, the web browser 38 includes a Java virtual machine (VM) 40. The Java VM executes programs written in the JAVA programming language.

Those skilled in the art will appreciate that the computer system configuration depicted in FIG. 1 is intended to be merely illustrative and not limiting of the present invention. For example, the present invention may also be practiced in a distributed environment or in a tightly coupled multiple processor environment. In addition, a computer system may include different peripheral devices and different memory configurations.

In the exemplary operating environment, the dynamically adjusting garbage collection is performed within the Java VM 40. The Java VM 40 includes a memory manager comprising a garbage collection mechanism and a facility for controlling the dynamic adjustment of garbage collection (i.e., a control subsystem). Although the present discussion focuses on an exemplary operating environment in which garbage collection is performed within the Java VM, those skilled in the art will appreciate that the present invention need not be practiced within a virtual machine and need not be limited to a Java-based environment. Instead, the present invention may be generally practiced in environments in which garbage collection is used and in other object oriented environments and non-object oriented environments.

The Java VM 40 controls a portion of the memory space in the computer system 10 that is allocated for Java objects. The memory space is divisible into blocks. Objects within the memory space allocated to the Java objects may either be live or dead. Live objects are those that are accessible by the Java computer program currently being executed by the Java VM. Dead objects (i.e., garbage) are those that are not accessible and have not yet been deallocated or returned to the free list of storage. The computer system 10 includes a mechanism maintained by the operating system 36 that identifies free storage space that may be allocated to programs.

Figure 2:
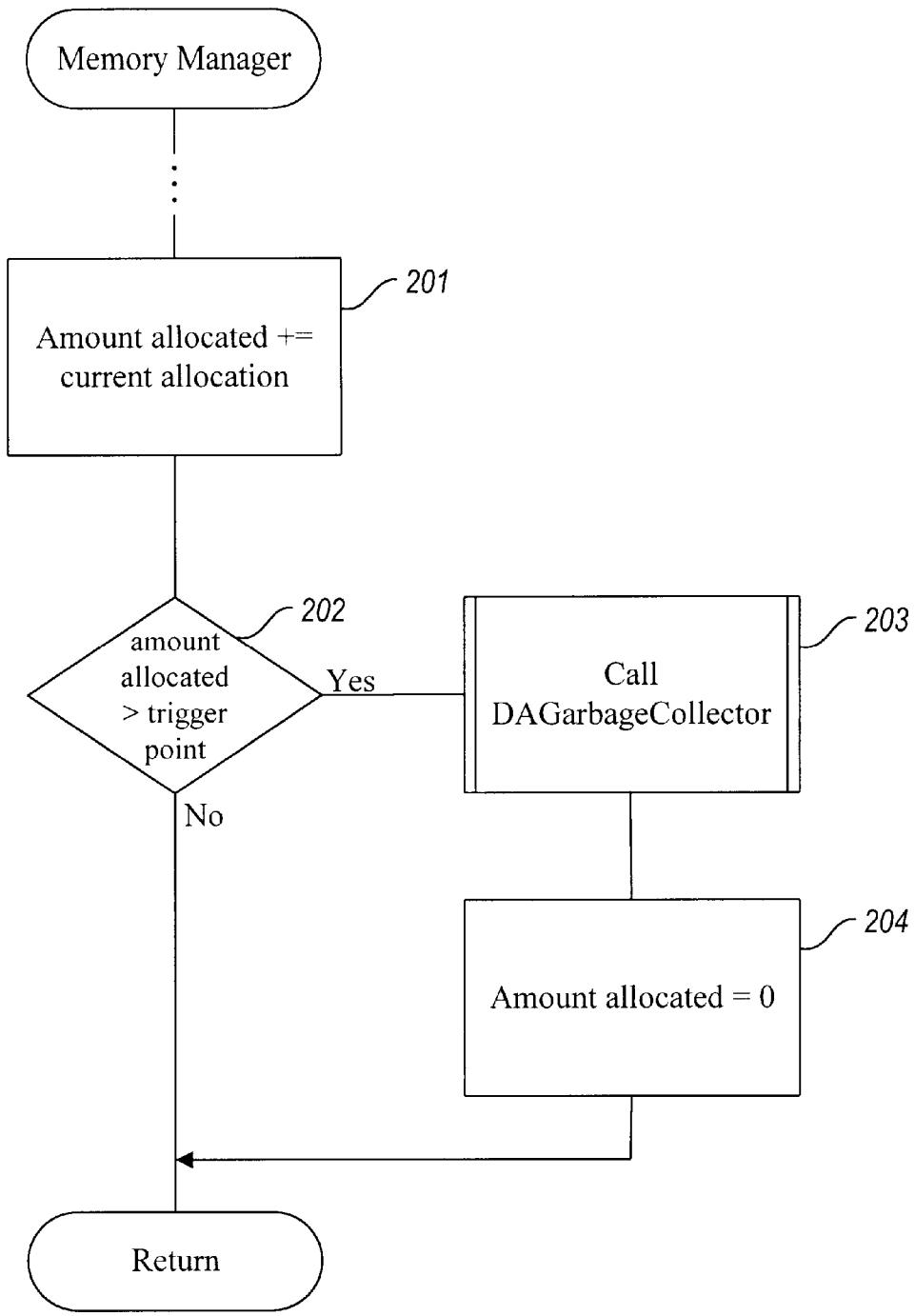
FIG. 2 is a flow diagram of an example memory manager routine that uses a trigger point to control when to perform garbage collection.

An overview of the operating of the exemplary operating environment will now be provided. FIG. 2 is a flow diagram of an example memory manager routine that uses a trigger point to control when to perform garbage collection. The memory manager performs conventional memory allocation in response to a request by a computer program to allocate a block of memory. Prior to completion, the memory manager determines whether the total amount of memory allocated since garbage collection was last performed is greater than the trigger point. If so, the memory manager invokes the dynamically adjusted garbage collector. The memory manager may also invoke the garbage collector at other times, such as when there is not enough memory in the free list to satisfy the request or when a certain time period has elapsed since garbage collection was last performed. The ellipsis above step 201 indicates conventional memory manager processing. In step 201, the memory manager increments the total amount of memory allocated since the garbage collection was last performed by the size of the current memory allocation. In step 202, if the total amount of memory allocated since garbage collection was last performed is greater than the trigger point, then the memory manager continues at step 203, else the memory manager returns to the computer program. In step 203, the memory manager invokes the DA garbage collection. In step 204, the memory manager resets the total amount of memory allocated since last invoking the garbage collector to zero and returns to the computer program.

In the following, three different embodiments of the DA garbage collector are described. The first embodiment is a DA garbage collector that uses a predefined single garbage collection technique (e.g., mark-and-sweep or copying), but dynamically adjusts the trigger point as to the amount of memory to allocate before performing the next garbage collection. The second embodiment is a DA garbage collector that dynamically selects the garbage collection technique, but does not adjust the trigger point. Indeed, the second embodiment may be used with a memory manager that invokes the garbage collection at periodic time intervals, rather than based on the amount of memory allocated. The third embodiment is a DA garbage collector that both dynamically selects the garbage collection technique and dynamically adjusts the trigger point as to the amount of memory to allocate before performing the next garbage collection.

Figure 3:
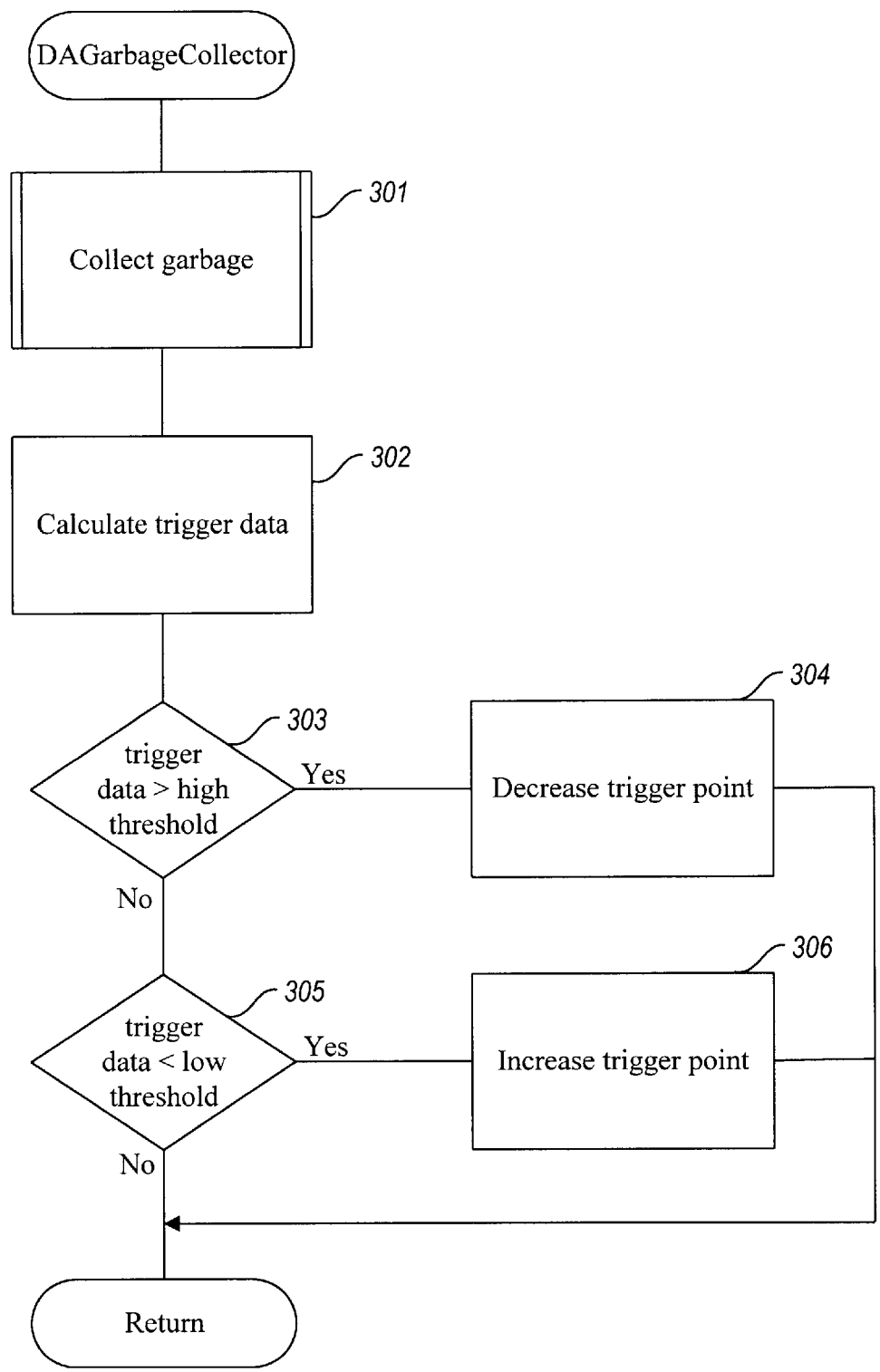
FIG. 3 is a flow diagram of the first embodiment of the DA garbage collector.

FIG. 3 is a flow diagram of the first embodiment of the DA garbage collector. This garbage collector dynamically adjusts the trigger point. In step 301, the garbage collector performs the garbage collection which may be any conventional technique or a technique that selects between multiple conventional techniques based on characteristics of the heap. In step 302, the garbage collector calculates new trigger data. The trigger data is used to determine whether to adjust the trigger point. The trigger data typically represents characteristics of the garbage collection that has just occurred in step 301. For example, the trigger data may be the ratio of the amount of garbage collected to the amount of memory that was allocated since garbage collection was last performed. Alternatively, the trigger data may be the ratio of the amount of garbage collected to the total amount of memory allocated to the computer program after the garbage collection. One skilled in the art will appreciate that various other characteristics of the garbage collection may be used to form the trigger data such as the ratio of garbage to the total amount of memory in the heap. In step 303, if the trigger data is greater than the high threshold, then the garbage collector continues at step 304, else the garbage collector continues at step 305. In step 304, the garbage collector decreases the trigger point so that garbage collection occurs more frequently and returns. In step 305, if the trigger data is less than the low threshold, then the garbage collector continues at step 306, else the garbage collector returns without adjusting the trigger point. In step 306, the garbage collector increases the trigger point so that garbage collection occurs less frequently and returns.

Figure 4:
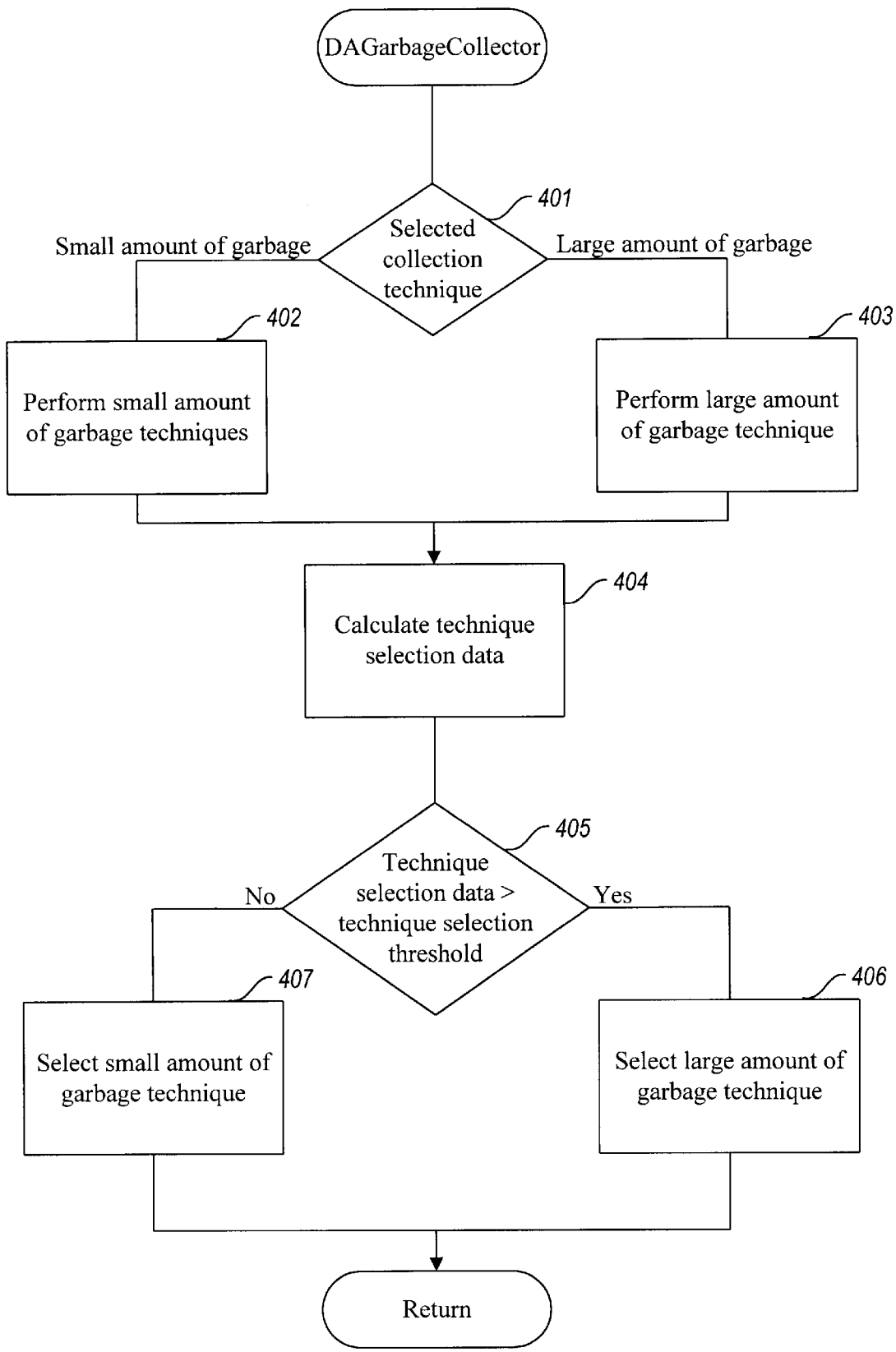
FIG. 4 is a flow diagram of the second embodiment of the garbage collector.

FIG. 4 is a flow diagram of the second embodiment of the garbage collector. This garbage collector dynamically selects the garbage collection technique. In step 401, if the collection technique currently selected is the small amount of garbage technique, then the garbage collector continues at step 402, else the garbage collector continues at step 403. In step 402, the garbage collector performs the small amount of garbage technique. In step 403, the garbage collector performs the large amount of garbage technique. In step 404, the garbage collector calculates technique selection data. The technique selection data may be the amount of garbage collected or may be a ratio of the amount of garbage collected to the amount of memory allocated to the computer program after the garbage is collected. In step 405, if the technique selection data exceeds the technique selection threshold, then the garbage collector continues at step 406, else the garbage collector continues at step 407. The technique selection threshold indicates the point to switch between the garbage collection techniques. In step 406, the garbage collector selects the large amount of garbage technique and returns. In step 407, the garbage collector selects the small amount of garbage technique and returns. The next time this garbage collection is invoked it will perform the selected garbage collection technique as determined in step 401.

Figure 5:
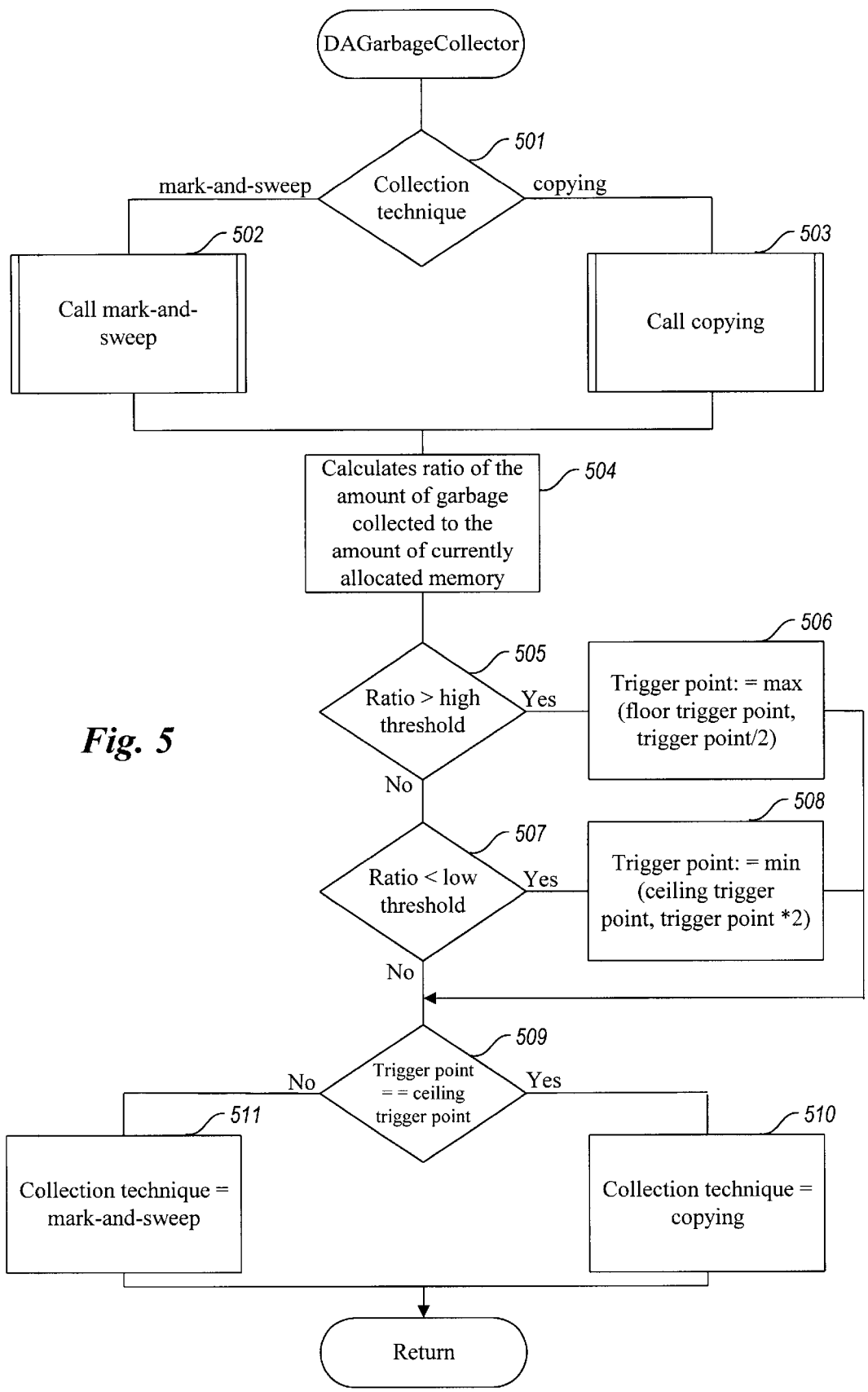
FIG. 5 is a flow diagram of the third embodiment of the DA garbage collector.

FIG. 5 is a flow diagram of the third embodiment of the DA garbage collector. This garbage collector combines both the dynamic selection of the collection technique and dynamic adjusting of the trigger point. This embodiment uses the mark-and-sweep garbage collection technique as the small amount of garbage technique and the copying garbage collection technique as the large amount of garbage technique. In step 501, if the collection technique currently selected is mark-and-sweep, then the garbage collector continues at step 502, else the garbage collector continues at step 503. In step 502, the garbage collector performs the mark-and-sweep garbage collection technique. In step 503, the garbage collector performs the copying garbage collection technique. In step 504, the garbage collector calculates the ratio of the amount of garbage just collected to the amount of memory allocated to the computer program after the garbage is collected. In step 504, if the calculated ratio is greater than the high threshold, then the garbage collector continues at step 506, else the garbage collector continues at step 507. In step 506, the garbage collector sets the trigger point to the maximum of the floor trigger point or one half of the current trigger point. One skilled in the art will appreciate that various other techniques and factors can be used for adjusting the trigger point. In step 507, if the calculated ratio is less than the low threshold, then the garbage collector continues at step 508, else the garbage collector continues at step 509. In step 508, the garbage collector sets the trigger point to the minimum of the ceiling trigger point and the trigger point times 2. In this embodiment, the technique selection data is the newly calculated trigger point, which is derived from the amount of garbage collected, and the technique selection threshold is the ceiling trigger point. In step 509, if the trigger point is equal to the ceiling trigger point, then the garbage collector continues at step 511, else the garbage collector continues at step 510. In step 510, the garbage collector selects the copying garbage collection technique and returns. In step 511, the garbage collector selects the mark-and-sweep garbage collection technique and returns. In this embodiment, the copying garbage collection technique is initially selected. Also, the initial value for the trigger point is 128 kilobytes of memory, and the floor trigger point is 64 kilobytes and the ceiling trigger point is 512 kilobytes.

Those skilled in the art will appreciate that the trigger point default value, floor trigger point, and ceiling trigger point are intended to be merely illustrative and not limiting of the present invention. In general these values are adjustable and may be set at values that are most appropriate for the given operating environment. Those skilled in the art will also appreciate that separate low and high thresholds need not be utilized; rather a single threshold may be utilized in a way that calculates a new trigger point each time garbage collection is performed. Moreover, more than two thresholds may be used to adjust the trigger point by varying increasing or decreasing values. That is, a medium low and a medium high threshold may be used. If the trigger data is between the low and the medium low threshold or between the medium high and high thresholds, then the trigger point may be increased by a factor 1.5 or decreased by a factor 1.5, and if the trigger data is below the low threshold or above the high threshold, then the trigger may be increased by a factor of 2 or decreased by a factor of 2. Those skilled in the art will further appreciate that the present invention is not limited to use with copying garbage collection and mark-and-sweep garbage collection but also may be used with other garbage techniques as well.

While the present invention has been described with reference to various embodiments, those skilled in the art will appreciate that various changes in form and detail may be made without departing from the intended scope of the present invention as defined in the appended claims.

What is claimed is:

1. A method in a computer system for collecting garbage, the method comprising:

determining an amount of memory that has been allocated since garbage was last collected;

when the determined amount exceeds a trigger point,
    determining whether a mark-and-sweep garbage collection technique or a copying garbage collection technique is currently selected;
    when it is determined that the mark-and-sweep garbage collection technique is currently selected, performing mark-and-sweep garbage collection;
    when it is determined that the copying garbage collection technique is currently selected, performing copying garbage collection;

calculating characteristics of the performed garbage collection;

adjusting the trigger point based on the calculated characteristics; and selecting either the mark-and-sweep garbage collection technique or the copying garbage collection technique based on the calculated characteristics.

2. The method of claim 1 wherein the garbage collection is performed by a Java virtual machine.

3. The method of claim 1 wherein the adjusting of the trigger point is based on a characteristic that is a ratio of the amount of collected garbage to the amount of allocated memory after garbage collection is performed.

4. The method of claim 1 wherein the adjusting of the trigger point is based on a characteristic of the amount of garbage collected.

5. The method of claim 1 wherein the selection of either the mark-and-sweep garbage collection technique or the copying garbage collection technique is based on a characteristic that is the adjusted trigger point.

6. The method of claim 1 wherein the selection of either the mark-and-sweep garbage collection technique or the copying garbage collection technique is based on a characteristic that is the amount of garbage collected.

7. The method of claim 1 wherein the mark-and-sweep garbage collection technique uses a free list and the copying garbage collection technique is modified to also use the free list.

8. A method in a computer system for collecting garbage within a heap, the method comprising:

determining a characteristic of the heap;

based on the determined characteristic, selecting a first garbage collection technique or a second garbage collection technique; and performing the selected garbage collection technique on the heap wherein the first garbage collection technique is a mark-and sweep garbage collection and the second garbage collection technique is copying garbage collection technique.

9. The method of claim 8 wherein the determined characteristic of the heap is an amount of garbage collected when garbage was last collected and wherein the first garbage collection technique is suitable for a small amount of garbage and the second garbage collection technique is suitable for a large amount of garbage.

10. The method of claim 8 wherein the determined characteristic of the heap is a trigger point representing amount of memory to be allocated between performing garbage collection.

11. The method of claim 10 wherein the trigger point is adjusted based on amounts of garbage previously collected.

12. The method of claim 8 wherein the determined characteristic is based on an amount of garbage previously collected.

13. The method of claim 8 wherein the determined characteristic is based on both an amount of garbage previously collected and an amount of memory currently allocated.

14. The method of claim 8 wherein the determined characteristic is based on a ratio of an amount of garbage previously collected and an amount of memory currently allocated.

15. The method of claim 8 wherein the first and second garbage collection techniques are dynamically selected based on a current characteristic of the heap.

16. The method of claim 15 wherein the first garbage collection technique is a mark-and-sweep garbage collection technique and the second garbage collection technique is a copying garbage collection technique.

17. The method of claim 16 wherein the mark-and-sweep garbage collection technique uses a free list and wherein the copying garbage collection technique is modified to use the free list.

18. A method in a computer system for determining when to perform garbage collection, the method comprising:

determining whether an amount of memory allocated since garbage collection was last performed exceeds a trigger point; and when it is determined that the amount of memory allocated since garbage collection was last performed exceeds the trigger point, performing garbage collection.

19. The method of claim 18 including after performing garbage collection, adjusting the trigger point based on an amount of garbage collected so that garbage collection is next performed based on the adjusted trigger point.

20. The method of claim 19 wherein the adjusted trigger point is limited by a floor trigger point and a ceiling trigger point.

21. The method of claim 18 including calculating trigger data and adjusting the trigger point based on the trigger data.

22. The method of claim 21 wherein the trigger data is based on amount of garbage collected during last garbage collection.

23. The method of claim 21 wherein the trigger data is based on both an amount of garbage collected during last garbage collection and an amount of memory currently allocated.

24. The method of claim 22 wherein the trigger point is adjusted when the trigger data is not within a low threshold and a high threshold.

25. The method of claim 24 wherein when the trigger data is below the low threshold, then the adjusting of the trigger point increases the trigger point.

26. The method of claim 24 wherein when the trigger data is above the high threshold, then the adjusting of the trigger point decreases the trigger point.

27. The method of claim 18 wherein the performing of the garbage collection includes selecting a first or a second garbage collection technique based on an amount of garbage previously collected.

28. The method of claim 27 wherein the first garbage collection technique is a mark-and-sweep garbage collection technique and the second garbage collection technique is a copying garbage collection technique.

29. The method of claim 27 wherein the first garbage collection technique is selected when a small amount of garbage has been previously collected and wherein the second garbage collection technique is selected when a large amount of garbage has been previously collected.

30. A method in a computer system for collecting garbage, the method comprising:

determining whether a small amount of garbage or a large amount of garbage has been generated;

when it is determined that a small amount of garbage has been generated, performing garbage collection without copying blocks that are not garbage; and when it is determined that a large amount of garbage has been generated, performing garbage collection with copying blocks that are not garbage.

31. The method of claim 30 wherein when the performing of garbage collection without copying blocks that are not garbage includes marking blocks that are not garbage and then collecting blocks that are not marked.

32. The method of claim 31 wherein the collected blocks are added to a free list.

33. The method of claim 30 wherein when the performing of garbage collection with copying blocks that are not garbage includes adding the blocks that are garbage and the blocks that are copied to a free list.

34. A computer system for performing garbage collection, comprising:

a heap including allocated blocks of memory that are accessible and allocated blocks of memory that are inaccessible; and a memory manager with dynamically adjusting garbage collection for allocating block of memory of the heap and for determining when to perform garbage collection on the heap based on the amount of memory that has been allocated since garbage collection was last performed.

35. The computer system of claim 34 wherein the memory manager with dynamically adjusting garbage collection uses a dynamically adjusted trigger point to indicated the amount of memory to be allocated before performing garbage collection.

36. The computer system of claim 35 wherein the trigger point is adjusted based on an amount of the allocated blocks of memory that are inaccessible.

37. A computer system for performing garbage collection, comprising:

a heap including allocated blocks of memory that are accessible and allocated blocks of memory that are inaccessible; and a memory manager with dynamically adjusting garbage collection for allocating block of memory of the heap, for determining when to perform garbage collection on the heap, and for selecting a garbage collection technique based on the allocated blocks of memory that are inaccessible.

38. The computer system of claim 37 wherein the memory manager with dynamically adjusting garbage collection selects a garbage collection technique that does not copy allocated blocks of memory that are accessible when a small amount of the allocated block of memory are inaccessible.

39. The computer system of claim 38 wherein the small amount is determined based on a previously performed garbage collection.

40. A computer-readable medium containing instructions for causing a computer system to determine when to perform garbage collection, by:

determining whether an amount of memory allocated since garbage collection was last performed exceeds a dynamically adjusted trigger point; and when it is determined that the amount of memory allocated since garbage collection was last performed exceeds the dynamically adjusted trigger point, performing garbage collection.

41. The computer-readable medium of claim 40 including after performing garbage collection, adjusting the dynamically adjusted trigger point based on an amount of garbage collected so that garbage collection is performed more frequently when large amounts of garbage are generated and less frequently when small amounts of garbage are generated.

42. The computer-readable medium of claim 40 wherein the dynamically adjusted trigger point is limited by a floor trigger point and a ceiling trigger point.

43. The computer-readable medium of claim 40 wherein the trigger point is adjusted when a measure of collected garbage is not within a low threshold and a high threshold.

44. The computer-readable medium of claim 43 wherein the measure of collected garbage is based on both an amount of garbage and an amount of memory allocated.

45. A computer-readable medium containing instructions for causing a computer system to collect garbage, by:

determining a characteristic of a previous garbage collection;

based on the determined characteristic, selecting a first garbage collection technique or a second garbage collection technique; and performing the selected garbage collection technique wherein the first garbage collection technique is a mark-and-sweep garbage collection technique and the second garbage collection technique is a copying garbage collection technique.

46. The computer-readable medium of claim 45 wherein the determined characteristic is an amount of garbage collected and wherein the first garbage collection technique is suitable for a small amount of garbage and the second garbage collection technique is suitable for a large amount of garbage.

47. The computer-readable medium of claim 46 wherein the first garbage collection technique does not copy blocks of memory that are not garbage.

48. The computer-readable medium of claim 46 wherein the first and second garbage collection techniques share a free list.

* * * * *

UNITED STATES PATENT AND TRADEMARK OFFICE
CERTIFICATE OF CORRECTION

PATENT NO.  : 6,065,020
DATED       : May 16, 2000
INVENTOR(S) : Patrick Dussud

It is certified that error appears in the above-identified patent and that said Letters Patent is hereby corrected as shown below:

Column 7,
Line 60, "511," should be -- 511, --

Column 10,
Line 53, "for allocating block" should be -- for allocating a block --
Line 60, "to indicated" should be -- to indicate --

Signed and Sealed this

Twentieth Day of November, 2001

Attest:

NICHOLAS P. GODICI
*Attesting Officer*   *Acting Director of the United States Patent and Trademark Office*

UNITED STATES PATENT AND TRADEMARK OFFICE
CERTIFICATE OF CORRECTION

PATENT NO. : 6,065,020  
DATED : May 16, 2000  
INVENTOR(S) : Patrick Dussud

Page 1 of 1

It is certified that error appears in the above-identified patent and that said Letters Patent is hereby corrected as shown below:

<u>Title page,</u>
Under OTHER PUBLICATIONS, error reads "DELETE:" should read -- 97-116, 143-181. --

Signed and Sealed this

Fifth Day of February, 2002

Attest:

JAMES E. ROGAN  
*Attesting Officer*     *Director of the United States Patent and Trademark Office*